May 2, 1944.  M. PRINGLE  2,348,147
BRAKE BEAM STRUT AND BRAKING ASSEMBLY
Filed Aug. 13, 1942  2 Sheets-Sheet 1
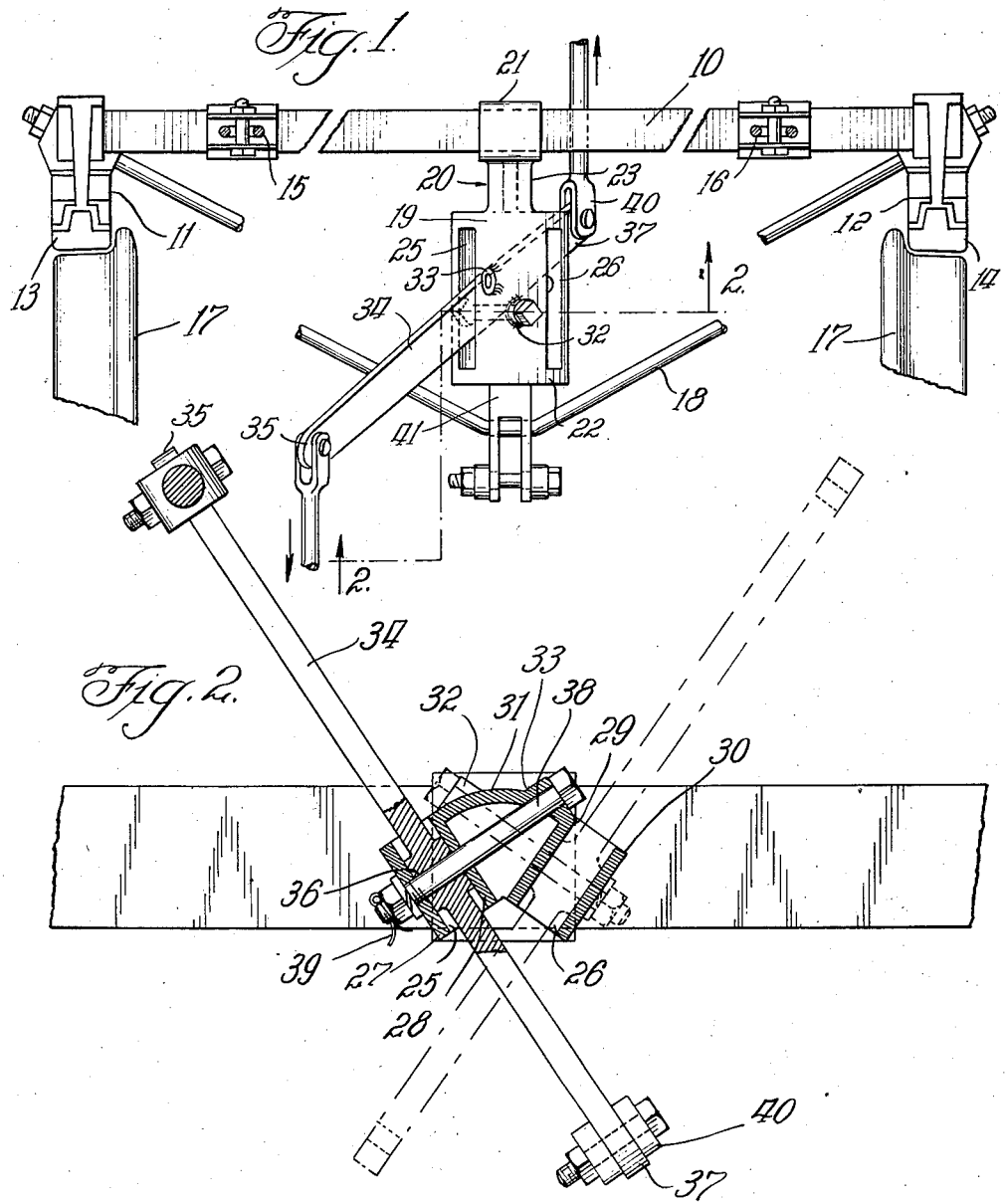
Inventor:
Malcolm Pringle
By John F Brezina
Att'y May 2, 1944.  M. PRINGLE  2,348,147
BRAKE BEAM STRUT AND BRAKING ASSEMBLY
Filed Aug. 13, 1942  2 Sheets-Sheet 2

Inventor:
Malcolm Pringle
By: John F Brezina
Atty

Patented May 2, 1944

2,348,147

UNITED STATES PATENT OFFICE 2,348,147

BRAKE BEAM STRUT AND BRAKING ASSEMBLY

Malcolm Pringle, Litchfield, Ill.

Application August 13, 1942, Serial No. 454,736

3 Claims. (Cl. 188—232)

My invention is directed to improved forms of brake beam struts used in connection with brake beam and brake shoe assemblies of railroad cars and other vehicles which utilize compressed air-operated types of mechanisms in association with movably mounted brake shoes.

In presently known brake-operating assemblies such as utilized on railroad cars having levers which transmit the compressed air compelled movement of the type commonly known, these sets of levers are so arranged and operatively connected that the compressed air-operated pistons will simultaneously pull two connecting rods toward the center of the car and away from opposite ends of the car. These connecting rods have their respective ends, which are nearest the ends of the car, pivotally connected to the upper ends of the brake beam struts which move the two brake beams and brake shoes carried thereby against the two pairs of wheels which are nearest the center of the car, namely the two pairs of wheels which are on the inside of the two trucks of each car.

Each of said inner brake levers is fulcrumed at intermediate points to the inner ends respectively of the brake beam struts which connect said brake levers to the transverse cross beam which in turn carries the brake shoes. Because of the necessary positions of the cooperating levers which operatively connect the main connecting rod to the brake levers, one of said main connecting rods is positioned near to one side of the car and the other main connecting rod is positioned near the opposite side of the car, and for this reason the brake levers which have their intermediate parts pivotally connected to the transverse brake beams must be disposed and positioned in diagonally and extending in upwardly and downwardly inclined positions when viewing the same toward either end of the car, this in order that the upper ends of the brake levers at one end of the car will be extended in upwardly inclined direction to the left with respect to the brake levers, and at the opposite end of the car the brake levers will be in upwardly inclined position to the right in order to align the upper ends of said brake levers with the main connecting rod thru which the compressed air-compelled movement is transmitted.

For this reason the brake beam struts which connect the two transverse brake beams at one end of the car and brake levers at said end must be for example "left hand" (inclined upwardly to the left) and the two corresponding brake beam struts at the opposite end of the car with the "right hand," (inclined upwardly to the right).

Brake beam struts as presently used on railroad cars are therefore made either right or left hand, and those made left hand are not interchangeable with those made right hand, and vice versa. For example, a left hand brake beam strut has that end on which the brake lever is fulcrumed formed so that the brake lever fulcrumed therein will be inclined in a direction extending upwardly to the left, and similarly the brake beam struts at the opposite end of the same car will have their fulcruming ends formed to hold the brake levers in an upwardly inclined direction to the right. As the main brake beam operating movement is transmitted through said brake beam struts to the transverse brake beams connected thereto, substantial stresses are encountered with resultant frequent breakages and failures of the brake beam struts, such breakages resulting in frequent replacements and therefore necessitating the maintenance in stock at various stations of the railroad of both right and left hand brake beam struts. This maintenance in stock at various spaced apart stations of the railroad of both left hand and right hand brake beam struts constitutes a substantial "inventory" maintenance and tied up capital representing the cost of such maintained inventory.

Another objectionable feature necessitated by presently known individual right hand brake beam struts and individual left hand brake beam struts is that at some stations of the railroad, at certain periods of time, the brake beam struts of either left hand or right hand will be used up with a more than adequate supply of the opposite type still in stock, and this not only necessitates the more frequent manufacture of brake beam struts of either one type or the other type, but necessitates the more frequent replenishment of the inventory supply of both types of struts at the various stations of a particular railroad.

It is an important object of my invention to provide a brake beam strut of a construction usable for either the right or left hand positions of a railroad car, and to suit either a right hand or left hand beam and to permit mounting and positioning of the lever in either the position inclined upwardly to the left or in the position inclined upwardly to the right.

A further object of my invention is the provision of an interchangeable brake beam strut for either right hand or left hand beams and for either right or left hand brake levers, and which includes enlarged intermediate portions having a pair of slots formed therein, which slots are disposed angularly with respect to each other and in substantially angular and intersecting planes so that the brake lever may be fulcrumed in either of said slots to position a brake lever into either an upwardly inclined left hand position or to an upwardly inclined right hand position.

A further object of my invention is the provision of an economically manufacturable brake beam strut capable of being mounted or cast as a single piece which has an intermediate body portion formed with longitudinally extending angularly disposed slots, said body portion also having a pair of transverse slots and bolt receiving apertures and passages, one of which passages transverses one of said slots and the other of which passages transverses the other of said slots, as as to permit the quick mounting of a brake lever in either of said slots according to the requirements of the particular case, and which said intermediate body portion has a central wall portion which substantially encloses the space between those parts thereof which define the two angular slots so as to prevent the entry and retention of dirt and rocks which might otherwise impair the proper operation of the brake lever.

Other important objects of my invention will be found in the following description, claims, and accompanying drawings.

Fig. 1 is an elevational view of my invention in association with the brake beam, having some parts broken away.

Fig. 2 is a top plan view taken on line 2—2 of Fig. 1.

Figure 3:
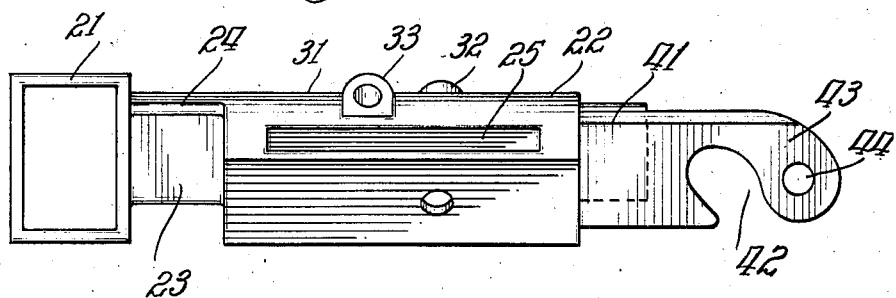
Fig. 3 is a side elevational view of my brake beam strut.

This invention (in one preferred though optional form) is illustrated and described in the following, reference being had by numerals to the accompanying drawings.

Referring particularly to Fig. 1, numeral 10 designates a conventional transversely extending and substantially horizontal metal brake beam which frequently is of either I or U shaped cross section. Said brake beam 10 has securely mounted on its opposite ends brake shoe heads 11 and 12, which are made in several forms of conventional constructions and which comprise means whereby replaceable brake shoes 13 and 14 are mounted in a conventional manner. In Fig. 1 the method illustrated is but one of several known methods of mounting the removable and replaceable shoes 13 and 14, and it is to be understood that the brake shoe heads or mounting means for the brake shoes do not represent the main part of my invention.

The brake beam 10 together with the brake shoe heads and connected brake shoes are suspended from the frame of the car by means of a pair of links or chains, fragments of each of which are illustrated in cross section in Fig. 1 and designated as numerals 15 and 16 respectively. Said chains are connected preferably by suitable clamps or clips which are secured in the proper spaced apart positions upon the brake beam 10 and which have suitable bolts secured therein which bolts pass through the lower end of the connecting chains, respectively.

In Fig. 1, I have illustrated only fragments of two conventional wheels designated as 17 to illustrate the relative position of the parts herein described with respect to a pair of car wheels, it being well known that in most railroad car trucks the brake beams and their respective brake shoes are on the inside of the two pairs of wheels of a truck, and that the brake beams are movable by a presently known system of levers in opposite directions and away from each other to apply the brakes against four wheels of the particular truck.

In reference thereto, numeral 18 is an angularly bent brake beam brace rod, whose opposite ends are suitably threaded and extend through suitably formed and positioned passages in the two brake beam shoe heads, and said opposite ends of said brace rod are securely anchored by suitable nuts threaded on the threaded ends respectively of said brace rod substantially as illustrated in Fig. 1. The central portion of said brace rod 18 is securely mounted in recesses formed in one end of the brake beam strut as more fully hereinafter described.

The brake beam strut is designated generally by reference numeral 19, and has one integral end formed in a rectangular box-like position which is of a size so that conventional sizes of brake beams 10 may be inserted therethrough to position said strut 19 centrally and perpendicularly with respect to said brake beams as substantially illustrated in Fig. 1. Numeral 20 designates a reduced neck portion which is of adequate cross section in order to provide for any stresses normally encountered in the braking operation. In Figs. 1 and 3 I have illustrated said reduced portion as being provided with optional flanges which are formed integral with the upper portion thereof, which may be added to strengthen the unit.

Referring particularly to Figs. 1 and 3, my novel strut is preferably cast from suitable metal in one piece, and comprises a box-like substantially rectangular end portion 21 which defines a rectangular passage, into which passage the conventional transverse brake beam is inserted and the strut thereby mounted in perpendicular position upon the substantial center of the brake beam. Said strut may be permanently secured in such position by suitable means such as welding, fastening elements or equivalent means.

Numeral 22 designates an enlarged central body portion, a cross sectional view of which is shown in Fig. 2, and said body portion 22 is connected to the box-like anchoring member 21 by an integral connecting rib or connecting member 23, which is of a sufficient size to absorb any stress in normal uses of the unit. In Fig. 3 I have illustrated said connecting member 23 as having integral transversely extending reinforcement flanges 24, one of which is shown in Fig. 3. The central body portion 22, which in part is of cross sectional shape approaching that of a trapezoid, has two longitudinally extending slots 25 and 26 formed therein at positions angularly disposed with one another and substantially in the relative positions illustrated in Figs. 1 and 2. Said slot 25 is defined by substantially parallel walls 27 and 28, and the slot 26 is defined by substantially parallel walls 29 and 30. It will be noted that the first said pair of walls are disposed at an acute angle with respect to the two walls 29 and 30 which partially define slot 26. Said respective walls merge into the opposite integral end portions of said body portion 22.

As in normal operating position the strut is in a substantial horizontal position and as indicated in Figs. 2 and 3, the normal upper edge portions of the two inner walls 28 and 29 are connected by an integral wall 31, which closes from above the substantially triangular optional chamber formed between the inner walls 28 and 29, and thereby eliminating any upwardly opening space in said body portion which, in absence of said wall 31, would provide a receptacle or trap for dirt, rocks and other foreign particles which are frequently thrown upwardly by the moving trucks, etc. This described specific construction of the central part of said body portion is optional as suitable equivalents may be utilized. In the particular illustration of the drawings, said upper connecting wall 31 which connects the upper edges of the slot-defining walls 28 and 29 is shown as of arcuate form, and it is to be understood that the particular shape thereof may be varied as desired.

The longitudinally extending walls 27 and 28 define a slot 25 having formed therein two aligned and correspondingly positioned apertures, and the two walls 29 and 30 defining slot 26 also have two correspondingly positioned and aligned apertures. Either one or the other of said pairs of apertures receive the pivoting and fulcruming bolt by means of which the brake lever is pivotally mounted in either one of the desired positions according to the requirements of the particular car. As illustrated in Figs. 1, 2 and 3, the upper wall 31 is provided with two spaced apart apertured bosses 32 and 33 respectively at spaced apart points, the apertures in said bosses extending through the upper wall 31 as indicated, and being in positions to align with the apertures in slot-defining walls 27 and 28 and the apertures in slot-defining walls 29 and 30, respectively.

When it is desired to mount a brake lever in the position upwardly extending to the left as indicated full in Fig. 2, the brake lever 34, which has an intermediate aperture 36 and opposite pivoting end apertures 35 and 37, is inserted into the slot 25, and a suitable bolt 38 is inserted through boss 33 and the apertures of slot-defining walls 27 and 28 and through aperture 36 of said brake lever 34 and secured in such position by suitable nut as indicated. An optional cotter pin 39 may be utilized to secure said bolt in the aforesaid position.

If the requirements of the particular installation necessitate the mounting of the brake lever in the position shown in dotted lines in Fig. 2 and upwardly extending to the right, the said brake rod is similarly inserted in slot 26 and pivotally mounted therein by means of a bolt 38 illustrated in such position in dotted lines in Fig. 2.

The upper end of the brake lever 34 is adapted to be pivotally connected to one end of a connecting rod (not shown) which is part of the set of compound levers which transmit the movement of the compressed air-operated piston of the air brake apparatus to said lever 34. The lower end of said brake lever 37 is in turn pivotally connected by suitable pin or bolt (shown at the lower right of Fig. 2) to one apertured end of a connecting rod 40, only an end portion of which is shown in Fig. 2, and which connecting rod 40 in turn transmits the brake operating movement to the lower end of a correspondingly positioned brake lever which is similarly operatively connected by a brake strut to the brake beam which carries the brakes which engage the center surfaces of the other pair of walls in the same truck (said second brake beam, brake lever, etc. of the outer pair of walls of the truck not being shown).

The outer end of the brake beam strut, shown in the lower part of Fig. 1 and at the right of Fig. 3, consists of an integral reduced end portion 41 which may be either a single solid unit or of U-shaped cross section, and which is provided with a recess or recesses 42, and which terminates in integral extensions or ears 43 which have correspondingly aligned apertures 44 therein. In assembling and mounting said brake strut with respect to the brake beam, the angularly bent brake rod 18, which is bent at a certain point substantially as indicated, is slipped into the recesses 42 of said strut extension 41, whereupon the ends of the brake rod are mounted in the brake shoe carrying heads 11 and 12 and secured therein by nuts threaded upon the opposite ends of said brake rods to firmly anchor said brake rod and hold the central part thereof in recesses 42. The apertured integral extensions or ears 43 provide means for optional supplemental suspension means (not shown) which usually take the form of a chain with an end clevis. Said supplemental anchoring and suspension means is conventionally used as a safety feature so that in the event of breakage of some part of the assembly, the brake beam strut will not fall downwardly to dig into the railway track or ties thereof to derail the car or cause other damage.

Experience in use of presently known brake beam struts discloses that on many occasions the brake beam struts have broken during movement of the train, with the result that quick repair by replacement of the broken brake strut is absolutely essential. In such instances, it has been necessary to go to and procure from the nearest stock on the railroad a brake strut, and this frequent breakage has resulted in the necessity and maintaining both right and left hand struts of presently known constructions at each supply point of the railroad.

My brake strut which is usable for either right or left hand positions as previously explained, permits the maintenance of only one kind of brake strut in the various supply stations of the railroad, thereby eliminating the necessity for maintaining at each of said supply stations an inventory of both right and left hand struts, this resulting in the need for maintaining considerably smaller inventory at each of such stations to provide for any emergency requirements such as stated. A further accomplishment of my invention is the novel feature of the strut construction which has been described which utilizes a minimum amount of metal and at the same time providing more than adequate strength of the strut, and providing a strut which can be quickly mounted as a replacement of any presently known strut of either right or left hand positions.

I have shown only one form of my invention which I believe is one preferred embodiment thereof; having described said preferred embodiment in terms employed merely as description thereof and not as terms of limitation, as I am aware that structural modifications thereof are possible and may be made without departing from the spirit of my invention.

I claim as my invention:

1. In a brake beam strut adapted to be connected at one end to a brake beam and adapted to provide means for fulcruming a brake lever of a car braking apparatus; a central body having a pair of spaced apart independent longitudinally extending slots therein, said slots being disposed angularly with respect to each other; said strut having an integral transversely passaged end portion; said body having portions thereof apertured to form a passage traversing one of said slots and having apertures therein forming a second pin-receiving passage traversing the other of said slots; said body being adapted to have a brake lever pivotally mounted and fulcrumed in either one or the other of said slots; the transversely passaged end portion integral with said body being adapted to receive and have a brake beam element mounted therein in position substantially perpendicular to the longitudinal axis of said strut; and an integral extension on the strut end opposite to said brake beam element receiving end and having brace rod-receiving recesses whereby the intermediate portion of the brace rod may be mounted therein, and having apertures therein adapted to have removably connected thereto a supplemental means for suspending said strut and connected parts.

2. In a brake beam strut adapted to form a part of a brake beam assembly of the described class; a transversely passaged loop-like end portion adapted to be connected from the central portion of the brake beam; an enlarged body portion including two pairs of longitudinally extending spaced apart walls, the walls of each pair being substantially parallel, one pair of walls being angularly disposed with respect to the other pair of walls so as to provide a central space between said pairs of walls of substantially triangular cross section; an upper wall connecting the upper edges of the two inner walls to close said central space from above; aligned apertures in each pair of said walls forming pin-receiving passages intersecting said slots respectively, either of said passages formed by a pair of said wall apertures being adapted to receive a pivoted pin or the like whereby a brake lever may be fulcrumed in slots in either right hand or left hand positions; and an integral apertured extension on the strut end opposite to said brake beam mounting end having side opening brace rod receiving recesses therein, said extension apertures providing means for attaching said strut to supplemental suspension means.

3. In combination with a brake beam and brace rod thereof; a one piece brake beam strut having a rectangular shaped passaged end portion mounted on the central part of said brake beam, said brake beam extending through said passage of said strut end portion; an enlarged central body portion connected to said passaged end portion and having a pair of longitudinally extending slots therein disposed angularly relative to each other; said central body portion having two sets of apertures therethrough, each set of apertures being positioned in alignment and to form two passages respectively extending substantially perpendicularly to the central longitudinal planes of said slots respectively; either set of said aligned apertures being adapted to receive a pivot bolt to provide for fulcruming a brake rod in either of said slots; and an integral extension on the strut end opposite to said rectangular shaped passaged end portion and having a pair of adjacent recesess therein opening on the edge surfaces of said extension, the central part of the brace rod being anchorable in the recesses of said extension; said extension end portion beyond said recesses having a passage therethrough adapted to provide means for attaching supplemental connection and suspension means thereto.

MALCOLM PRINGLE.